United States Patent
Izumi et al.

[11] Patent Number: 6,006,715
[45] Date of Patent: Dec. 28, 1999

[54] PUMP DRIVE STRUCTURE FOR A TWO-CYCLE ENGINE

[75] Inventors: Yoshio Izumi; Hitoshi Yokotani, both of Saitama, Japan

[73] Assignee: Honda Giken Kogyo Kabushiki Kaisha, Tokyo, Japan

[21] Appl. No.: 09/015,899

[22] Filed: Jan. 30, 1998

[30] Foreign Application Priority Data

Jan. 31, 1997 [JP] Japan .................................... 9-053786

[51] Int. Cl.⁶ .................................................. F02B 75/06
[52] U.S. Cl. ........................ 123/192.2; 74/591; 74/15.63; 180/190
[58] Field of Search ........................... 180/190, 53.6, 180/53.8; 74/591, 15.63; 123/41.47, 196 R, 192.2

[56] References Cited

U.S. PATENT DOCUMENTS

| | | | |
|---|---|---|---|
| 5,172,786 | 12/1992 | Ishibashi et al. | 180/190 |
| 5,174,257 | 12/1992 | Ozawa | 123/192.2 |
| 5,191,859 | 3/1993 | Fujiwara | 123/41.44 |
| 5,218,885 | 6/1993 | Nakano et al. | 74/591 |
| 5,542,387 | 8/1996 | Okubo | 123/192.2 |
| 5,588,405 | 12/1996 | Sawa et al. | 123/90.33 |
| 5,829,401 | 11/1998 | Masuda | 123/179.25 |

FOREIGN PATENT DOCUMENTS

| | | |
|---|---|---|
| 2-2013707 | 4/1990 | Japan . |
| 4112924 | 4/1992 | Japan . |

*Primary Examiner*—Robert J. Oberleitner
*Assistant Examiner*—Daniel Yeagley
*Attorney, Agent, or Firm*—Birch, Stewart, Kolasch & Birch, LLP

[57] ABSTRACT

To provide a pump drive structure capable of making a vehicular width more compact. A drive side pulley of a V-belt transmission is mounted on a right end of a crank shaft provided on an engine. A balancer drive gear is provided on the crank shaft opposite to the drive side pulley in the axial direction. The balancer drive gear is meshed with a balancer driven gear on a balancer shaft disposed in parallel to and directly under the crank shaft. Further, a pump drive gear provided at an axial end of the balancer shaft is meshed with driven gears of pump shafts of the water pump and the oil pump distributed on the front and rear sides of the balancer shaft. Thus, the water and oil pumps are simultaneously driven by the balancer shaft.

7 Claims, 10 Drawing Sheets

PUMP DRIVE STRUCTURE FOR A TWO-CYCLE ENGINE

BACKGROUND OF THE INVENTION

1. Field of the Invention

The present invention relates to a pump drive structure for a two-cycle engine.

2. Background Art

Japanese Utility Model Publication No. Hei 2-13707 discloses a pump drive structure in which a balancer shaft is provided in parallel to and in front of a crank shaft of a two-cycle engine and is driven by a balancer drive gear, and a water pump is disposed concentrically with the balancer shaft is driven by the balancer shaft.

Japanese Patent Laid-open No. Hei 4-112924 discloses a pump drive structure in which a water pump and an oil pump having pump shafts in parallel to a crank shaft of an engine are disposed in front of a crank case in such a manner so as to be positioned to the right and left, and the pump shafts are rotated by a balancer shaft disposed in parallel to the crank shaft and rotated by the crank shaft.

Incidentally, since a two-cycle engine primarily compresses a fuel-air mixture in a crank chamber, a balancer shaft must be partitioned from the crank chamber, and further, when the balancer shaft is close to the crank shaft for making compact the engine, a balancer weight is distributed on both sides of the crank weight.

In the case of adopting a transmission type in which a drive side pulley of a V-belt type transmission is mounted on one end of a crank shaft, if a balancer drive gear is provided on a crank shaft on the drive side pulley side, there are required a wall for partitioning the crank chamber from a balancer drive gear chamber for lubrication of the gear, a seal for the wall portion, and a wall for partitioning the balancer drive gear chamber from the atmospheric air side for supporting the drive side pulley, as a result of which the drive side pulley must be disposed separately from the crank chamber by the presence of these walls, seal, and the thickness of the balancer drive gear.

Consequently, since not only the vehicular width is increased but also the crank shaft is made longer, the crank shaft must be increased in diameter in order to withstand a belt tension of the V-belt transmission, so that the weight is increased.

On the other hand, by driving a water pump and an oil pump using a balancer shaft, the drive structure for these accessories is simplified. Accordingly, in the case where the pump is driven by making use of the balancer shaft and simultaneously the V-belt type transmission is connected to a crank shaft, it is required not to increase the width and the weight of the body.

SUMMARY AND OBJECTS OF THE INVENTION

To solve the above problem, according to the present invention, there is provided a pump drive structure for a two-cycle engine in which a balancer shaft is provided in parallel to a crank shaft of the two-cycle engine and is rotated by a balancer drive gear provided on the crank shaft, and a pump is driven by the balancer shaft, characterized in that the balancer shaft is provided directly under the crank shaft and a drive side pulley of a V-belt type transmission is provided on one end of the crank shaft; and the balancer drive gear is disposed on the crank shaft to be opposed to the drive side pulley in the axial direction with a crank weight being put therebetween.

Preferably, a water pump and an oil pump are driven by the balancer shaft, and the water pump and the oil pump are distributed on the front and rear sides of the balancer shaft.

In a snowmobile including a track device behind the engine, preferably, a heat exchanger is provided over a track belt and the water pump is disposed behind the balancer shaft, and the water pump is communicated to the heat exchanger.

The drive side pulley of the V-belt type transmission is provided on one end of the crank shaft and the balancer drive gear is disposed opposite to the drive side pulley in the axial direction in such a manner so as to hold the crank weight between the drive side pulley and the balancer drive gear. As a result, it is not required to provide the balancer drive gear requiring lubrication between the crank chamber and the drive side pulley, so that the drive side pulley can be disposed at a position near the crank chamber. Thus, it is possible to eliminate the necessity of increasing the length of the crank shaft.

Accordingly, the pump drive structure can be simplified by driving the water pump and the oil pump using the balancer shaft. Further, although the drive side pulley of the V-belt type transmission is connected to the crank shaft of the two-cycle engine for primarily compressing a fuel-air mixture in the crank chamber, the necessity of increasing the width and weight of the body can be eliminated. Additionally, since the balancer shaft is disposed directly under the crank shaft, the gravity center can be lowered.

Since the water pump and the oil pump are distributed on the front and rear sides of the balancer shaft and are driven by the common balancer shaft, these pumps can be effectively driven and also the accessories can be concentratedly disposed under the engine.

In the case where the engine is adapted for use with a snowmobile including a track device behind of the engine, the water pump is disposed behind the balancer shaft, and consequently, by providing the heat exchanger in the floor over the track belt and communicating the heat exchanger to the water pump, the piping between the heat exchanger and the water pump can be shortened and also the piping structure can be simplified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
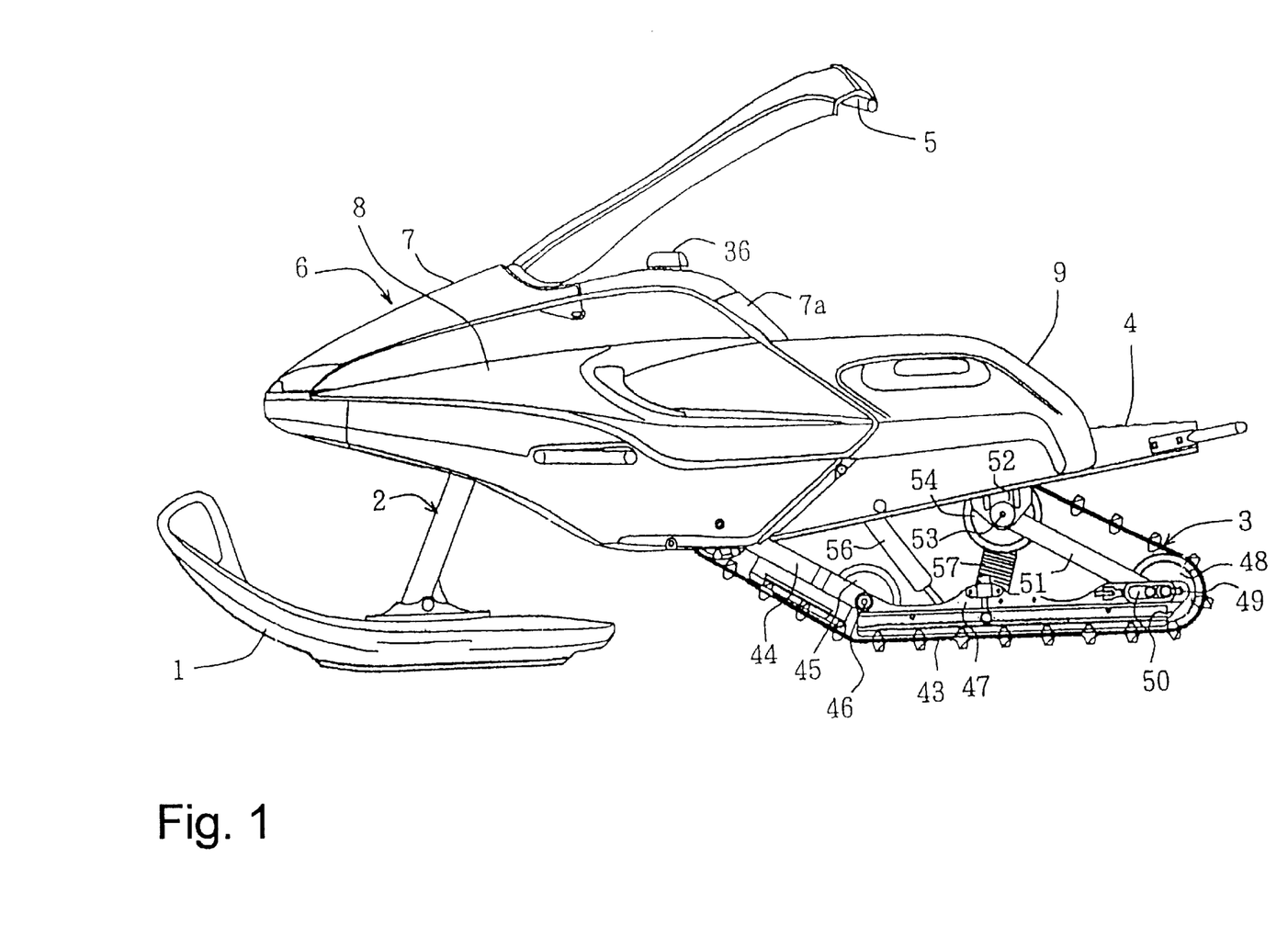
FIG. 1 is a side view of a snowmobile.

A schematic structure of the entire snowmobile will be first described with reference to FIGS. 1 and 2. The snowmobile has at a front body thereof a steering ski 1 supported by a telescopic type erecting front suspension 2, and at a rear body thereof a track device 3 driven by an engine (described later).

A floor 4 is provided over the track device 3. A driver stands on the floor 4 and operates a handlebar 5. The floor 4 is formed into an approximately reversed Ushape in transverse cross-section. Right and left side surfaces of the floor 4 are taken as erected walls.

A body cover 6 for covering a body includes a front cover 7, side covers 8, and a rear cover 9. The front cover 7 covers a portion extending rearwardly over an engine room at the front body. The side covers 8 cover portions of the body on both sides of the front cover 7. The rear cover 9 extends longer rearwardly from the side covers 8 along right and left sides of the floor 4 and covers side portions of a driver's space over the floor 4.

Figure 2:
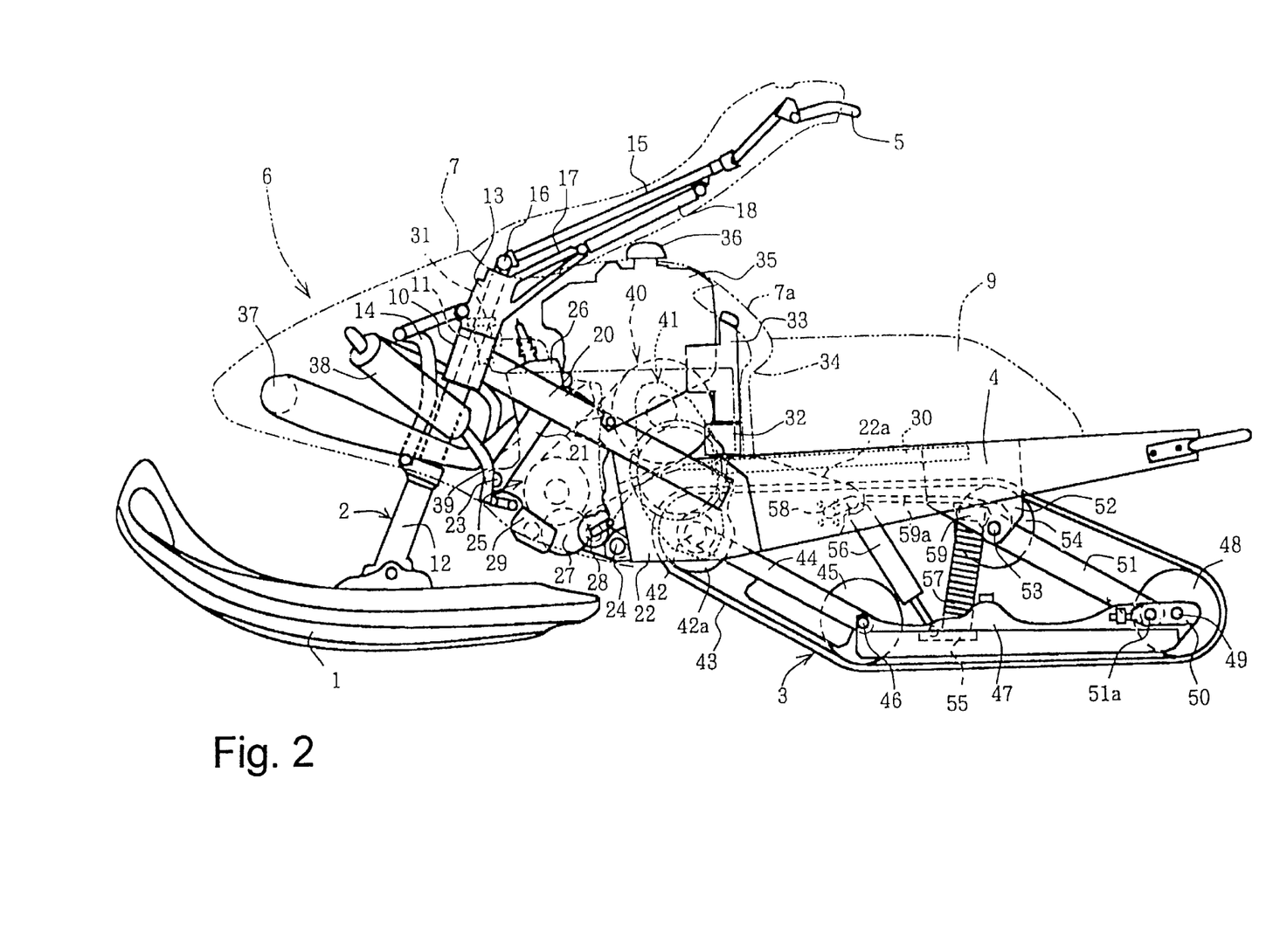
FIG. 2 is a side view of the snowmobile in a state in which a body cover is removed.

As will be apparent from FIG. 2, a head pipe 10 is provided at the front body and the front suspension 2 is fixedly surrounded by the head pipe 10. An inner tube 11 of the front suspension 2 extends obliquely in the vertical direction with a lower end portion thereof turnably supported by an outer tube 12.

A handle boss 13 is mounted around an outer periphery of an upper end portion of the inner tube 11 in such a manner so as to be turnable with the inner tube 11 taken as a pivot and to be axially fixed. The handle boss 13 is connected to the upper end portion of the outer tube 12 with a suspension link 14.

The suspension link 14 is extensible by vertical movement of the outer tube 12. An intermediate portion of the suspension link 14 projects in a state being bent forwardly so as to sufficiently ensure a chamber space (described later) surrounded by a portion of the body cover 6 positioned in front of the head pipe 10.

A lower end portion of a handle post 15 is connected to a top portion of the handle boss 13 in such a manner so as to be vertically Lockable through a handle post pivot 16. A handle link 18 composed of a damper is mounted between a link stay 17 and a portion of the handle post 15 near the handlebar 5. The link stay 17 integrally extends obliquely upwardly and rearwardly from the top portion of the handle boss 13.

These front suspension 2, head pipe 10, and handle boss 13 form a steering shaft of the steering ski 1. The handle post pivot 16 is positioned between a rear end portion of the steering ski 1 and a front end portion of the track device 3.

A pair of right and left main frames 20 extend obliquely downwardly and rearwardly from the head pipe 10. Each main frame 20 has a down-tube 21 and a pivot plate 22. The down-tube 21 extends downwardly from a portion of the main frame 20 near the head pipe 10, and the pivot plate 22 extends downwardly from a rear portion of the main frame 20.

A water-cooled type two-cycle single-cylinder engine 25 is supported on the body side through engine mounts 23 and 24 respectively provided on the down-tubes 21 and the pivot plates 22. A cylinder portion 26 of the engine 25 is positioned between the right and left main frames 20, and the center of the engine 25 is positioned at an approximately central portion of the body.

A water pump 28 and an oil pump 29 are provided on a lower portion of a crank case 27 constituting the engine 25. The water pump 28 is used to supply cooling water from a heat exchanger 30 contained in a ceiling portion of the floor 4 into the cylinder portion 26.

The cooling water from the cylinder portion 26 is fed to the heat exchanger 30 to be effectively cooled, and is then returned into the water pump 28. A water inlet 31 of the heat exchanger 30 is provided to the side of the head pipe 10.

The heat exchanger 30, which has a width nearly equal to a width of the ceiling portion of the floor 4, has a wide surface area. Also, the heat exchanger 30 is superimposed on the ceiling portion of the floor 4 in the vertical direction to mutually increase the rigidity of the heat exchanger 30 and the floor 4.

The oil pump 29 is connected to an oil tank 33 supported on an upper front portion of the floor 4 together with a battery 32. Work with regard to maintenance of the battery 32 and the oil tank 33 can be performed by opening a lid 34 formed to a partitioning wall 7a which longitudinally partitions the driver's space over the floor 4 from the engine room in front of the driver space.

The partitioning wall 7a is formed of a portion of the front cover 7 which is rounded on the back surface of a fuel tank 35 while covering an upper surface of the fuel tank 35. The fuel tank 35 is positioned in front of the battery 32 and the oil tank 33 and is supported on the main frames 20. A tank cap 36 is mounted on the fuel tank 35.

An exhaust chamber 37 extends forwardly from an exhaust port of the engine 25, and is arranged in the chamber space surrounded by the body cover 6 positioned in front of the engine 25. In the chamber space, the exhaust chamber 37 extends in the form of an approximately semicircular shape in a plan view along the inner surface of the body cover 6. A silencer 38 connected to the exhaust chamber 37 is disposed along the upper side of the exhaust chamber 37. The piping of the exhaust system thus meanders in an approximately two-stage manner. The exhaust gas is finally exhausted downwardly towards the front side of the engine 25 from a tail pipe 39.

A drive output of the engine 25 is transmitted through a V-belt type transmission 40 to a gear box 41 containing a final reduction gear mechanism. The gear box 41 is supported on the main frames 20 and the pivot plates 22 and is adapted to finally reduce the drive force transmitted from the V-belt type transmission 40 and to rotate a drive shaft 42.

Drive wheels 42a are integrally supported by the drive shaft 42, and are rotated integrally with the drive shaft 42. Outer peripheral portions of the drive wheels 42a are meshed with irregularities formed on the inner surface of a track belt 43 for driving the track belt 43.

With respect to the drive shaft 42, the left end portion is supported by the pivot plate 22 and the right end portion is supported by the gear box 41. Front end portions of a pair of right and left rear arms 44 extending obliquely downwardly and rearwardly are turnably supported around both the end portions of the drive shaft 42.

Both rear end portions of the rear arms 44 are connected to front end portions of right and left side rails 47 extending in parallel to each other through an idle shaft 46 of an idle wheel 45.

Shaft position adjusting plates 50 for supporting the idle shaft 49 of the idle wheel 48 are supported by both rear end portions of the side rails 47 in such a manner so as to be movable fore and aft. A lower end portion of a rear link 51 disposed in parallel to the rear arm 44 is connected to each shaft position adjusting plate 50 through a connecting member 51*a*.

An upper end portion of the rear link 51 is rotatably mounted to a stay 52 projecting downwardly from a side surface of the floor 4 through an idle shaft 53. A track belt 43 is wound around the idle wheels 54 supported by the idle shaft 53, other idle wheels 46 and 48, and the drive wheels 42*a* supported by the drive shaft 42, to constitute the track device 3.

The track device 3 forms a parallelogram link formed of the floor 4, rear arms 44, side rails 47, and rear links 51. A cross-plate 55 is formed between intermediate portions of the right and left side rails 47, and both a damper 56 and a suspension spring 57, which constitute a rear suspension, extend obliquely vertically from the cross-plate 55 in such a manner so as to be widen towards the upper side in a side view.

An upper end portion of the damper 56 is supported by a cross-pipe 58 supported between right and left extensions 22*a* extending rearwardly in the floor 4 from rear portions of the pivot plates 22. An upper end portion of the suspension spring 57 is supported by a spring holder 59 turnably supported by the idle shaft 53. The spring holder 59 is supported by a rear end portion of a spring holder rod 59*a*. The spring holder 59*a* extends rearwardly with its front end co-fastened with an upper end portion of the damper 56.

Next, a detailed structure of the drive/power transmission system will be described with reference to FIGS. 3 to 8. The drive/power transmission system is constituted of the engine 25, V-belt type transmission 40 and gear box 41, which are disposed in an approximately N-shape (see FIG. 5). As will be apparent from FIG. 4, the engine 25 is a two cycle engine in which air is sucked from a carburetor 19 into a crank case 27 and is preliminarily compressed in the crank case 27.

Figure 3:
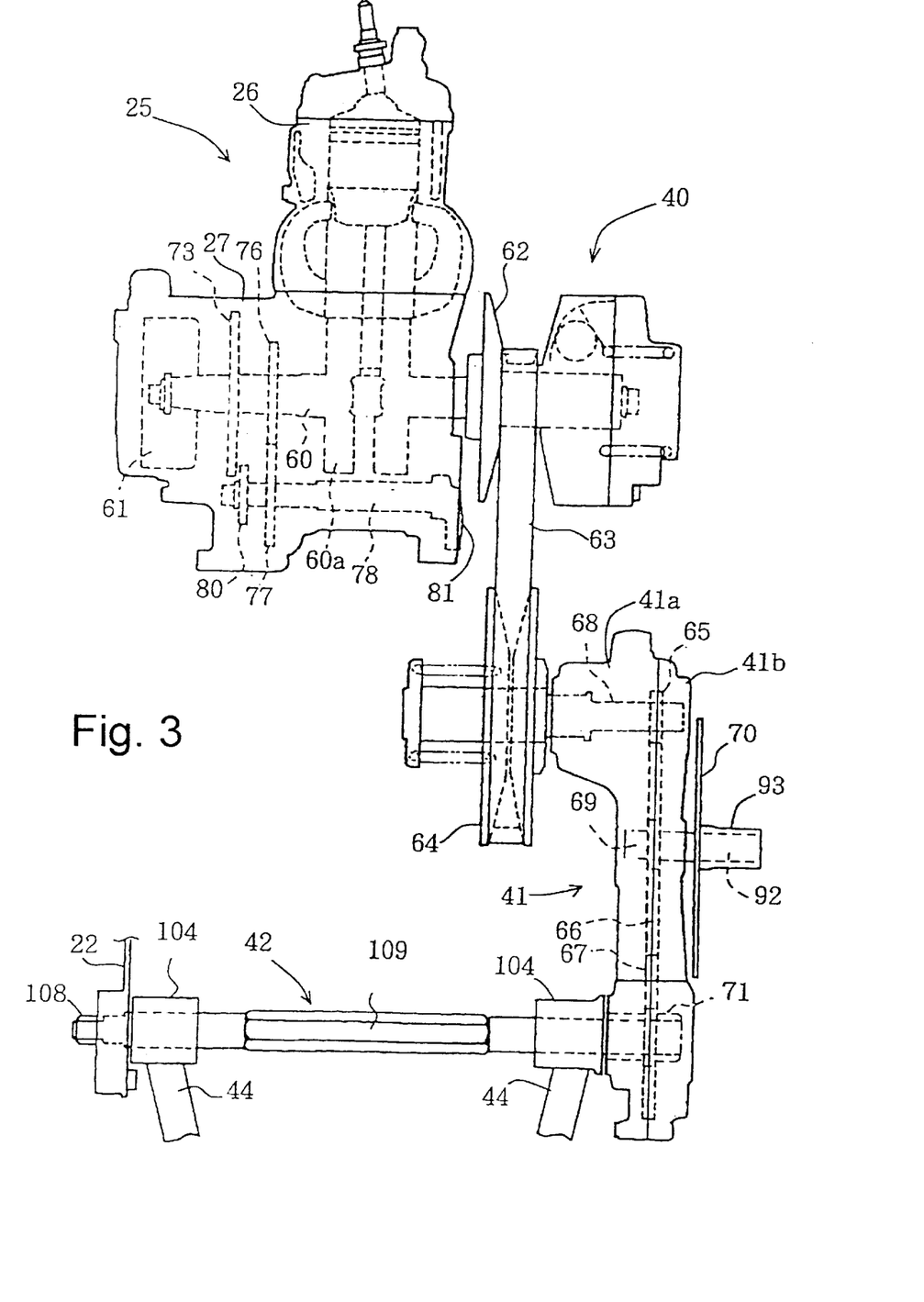
FIG. 3 is a schematic plan view in development of a drive power transmission system.
Figure 4:
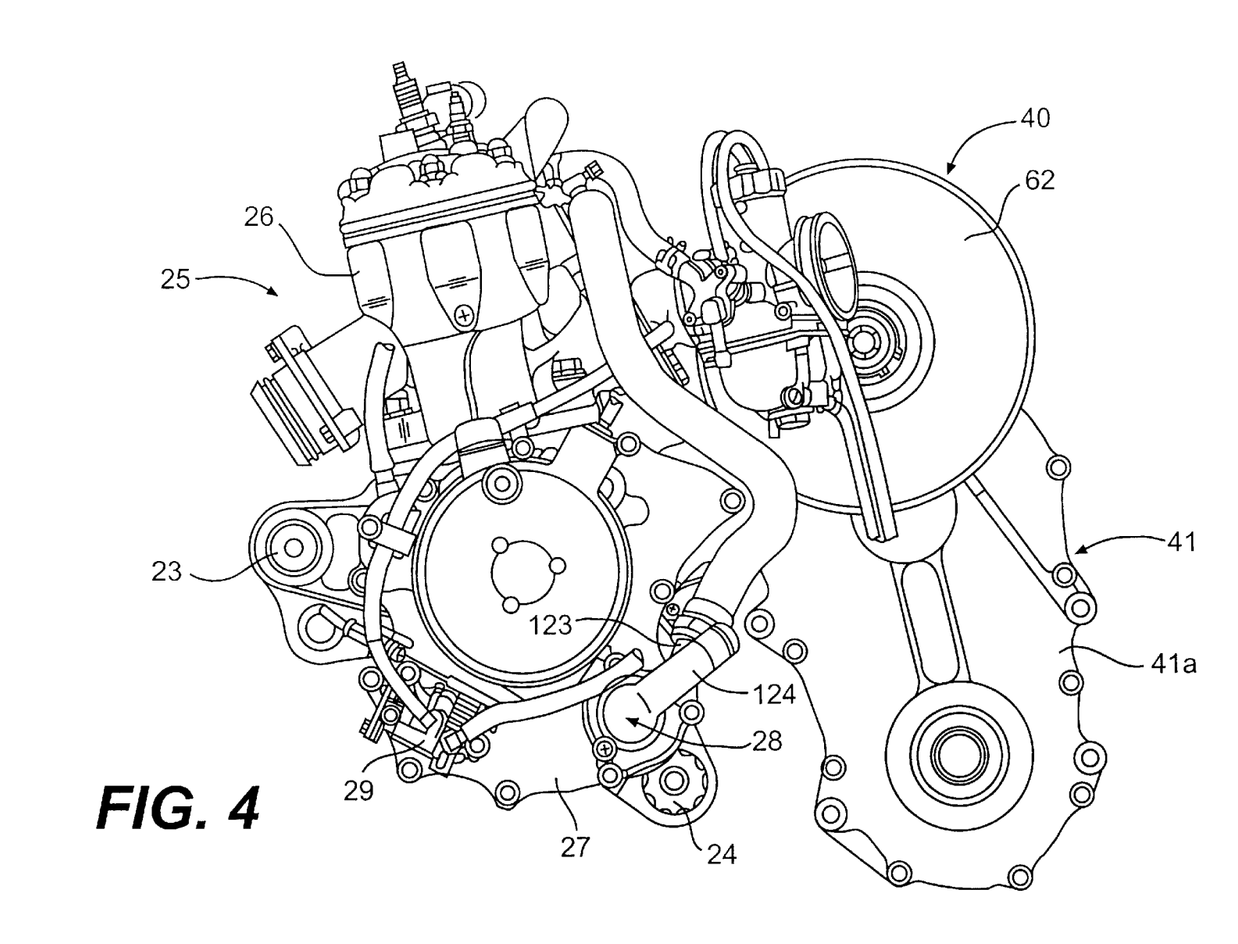
FIG. 4 is a left side view of the drive power transmission system.
Figure 5:
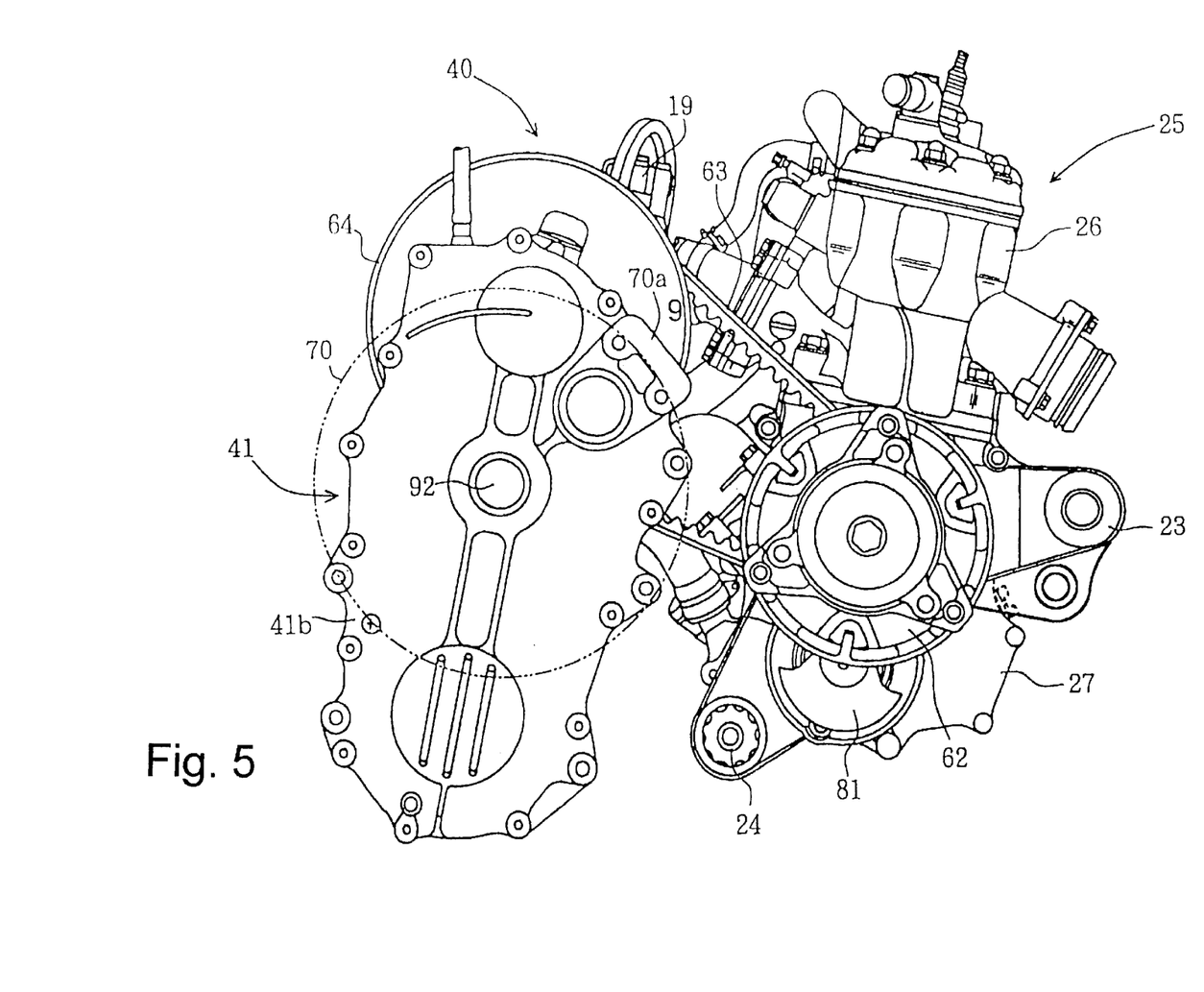
FIG. 5 is a right side view of the drive power transmission system.

FIG. 3 shows a schematic configuration of the drive/power transmission system. Referring to FIG. 3, one end of a crank shaft 60 of the engine 25 is mounted with an ACG AC generator 61 and the other end thereof extends outwardly from the crank case 27. A drive side pulley 62 constituting the known V-belt type transmission 40 is mounted to the extension of the crank shaft 60.

In the V-belt type transmission 40, a V-belt 63 is wound around the drive side pulley 62 and a driven side pulley 64 disposed rearwardly and upwardly of the drive side pulley 62 (see FIGS. 3 and 5), to perform a primary continuous variable transmission of a rotational output of the crank shaft 60 on the gear box 41 side.

With respect to the arrangement of the parts constituting the drive/power transmission system, the gear box 41 is disposed to the right side in the width direction of the body from the drive side pulley 62 of the V-belt type transmission 40 and also to the right from the main frames 20, and the engine 25 and the V-belt type transmission 40 are disposed inside the right and left main frames 20. More specifically, the V-belt type transmission 40 is held between the gear box 41 and the engine 25.

The gear box 41 includes a case composed of right and left halves 41*b* and 41*a*. A triaxial in-line type gear train composed of an input gear 65, an idle gear 66 and a final gear 67 is contained in the case. An input shaft 68 mounted with the input gear 65 extends outwardly from the gear box 41 and the driven side pulley 64 is mounted to the extension of the input shaft 68.

An idle shaft 69 mounted with the idle gear 66 extends outwardly from the gear box 41 opposite to the input shaft 68, and a brake disk 70 is mounted to the extension of the idle shaft 69. The brake disk 70 is braked by a brake caliper 70*a* provided on the half case 41*b* of the gear box 41 (see FIG. 5).

A final shaft 71 mounted with the final gear 67 is a hollow shaft, into which one end of the drive shaft 42 is removably fitted. The gear box 41 is filled with lubricating oil in which the gear train is dipped.

Figure 6:
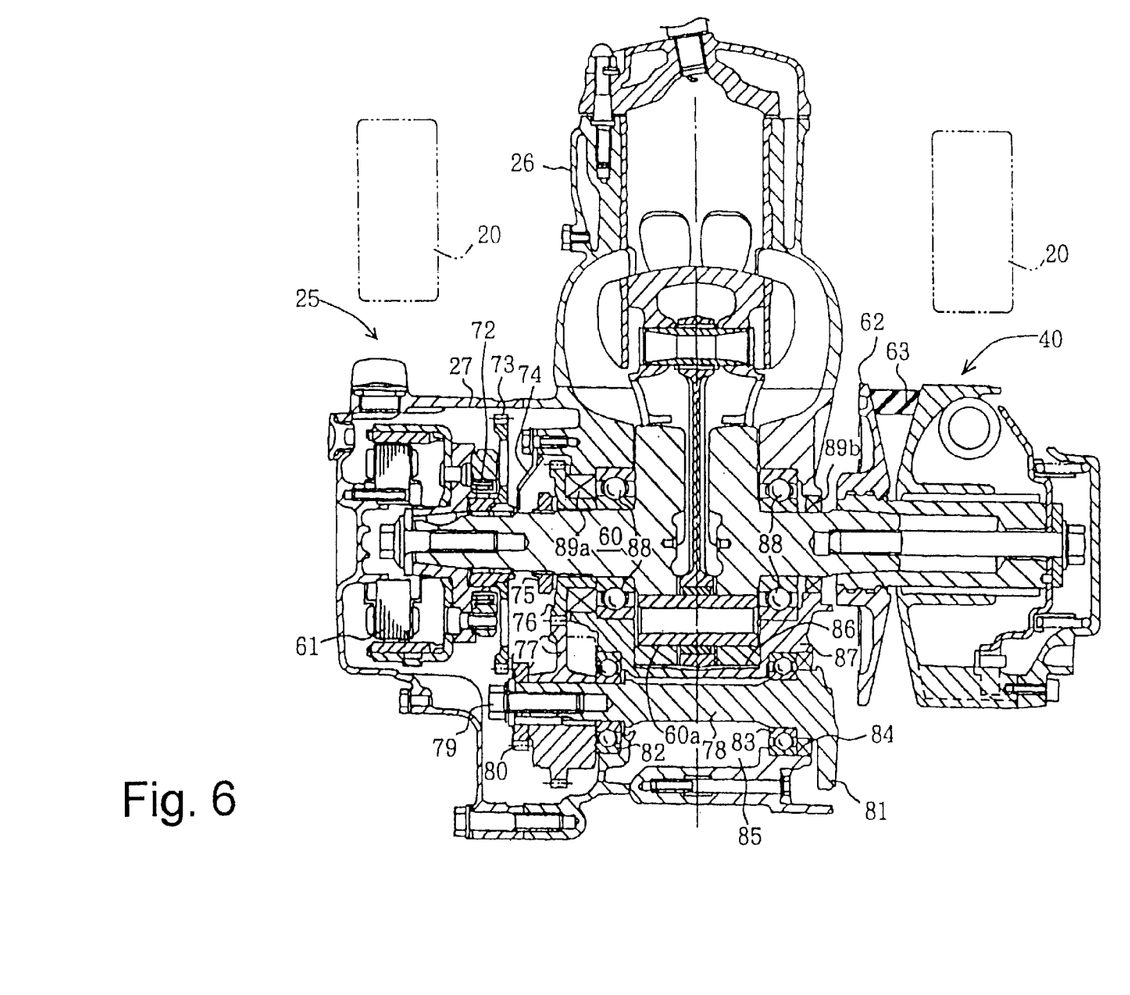
FIG. 6 is a sectional plan view of an engine portion.

As will be apparent from FIG. 6, a starter driven gear 73 is supported, at a portion near the ACG 61, by the crank shaft 60 of the engine 25 through a one-way clutch 72. The movement of the starter driven gear 73 in the thrust direction is restricted by a gear presser plate 74.

A balancer drive gear 76 fastened by a nut 75 is provided on the crank shaft 60, which is meshed with a balancer driven gear 77 for rotating a balancer shaft 78 disposed in parallel to the crank shaft 60.

A pump drive gear 80 is mounted on one end of the balancer shaft 78 with a bolt 79, and a balancer weight 81 is integrally provided on the other end of the balancer shaft 78. Two intermediate portions of the balancer shaft 78 near the balancer driven gear 77 and the balancer weight 81 are rotatably supported on the crank case 27 by bearings 82 and 83. A seal 84 is provided outside the bearing 83 on the balancer weight 81 side.

A balancer chamber 85 for containing the balancer shaft 78 is partitioned, by a journal wall 87, from a crank chamber 86 for containing a crank weight 60*a*. The balancer driven gear 77 and the balancer weight 81 are disposed outside the crank chamber 86. The balancer chamber 85 is filled with lubricating oil in the crank case 27 and thereby the bearings 82 and 83 are dipped in the oil. The balancer chamber 85 is sealed from the exterior with a seal 84.

The crank shaft 60 is rotatably supported, at a portion near the crank weight 60*a*, on a wall 87 by a bearing 88, and the outside of the crank chamber 86 is sealed with seals 89*a* and 89*b*.

Figure 7:
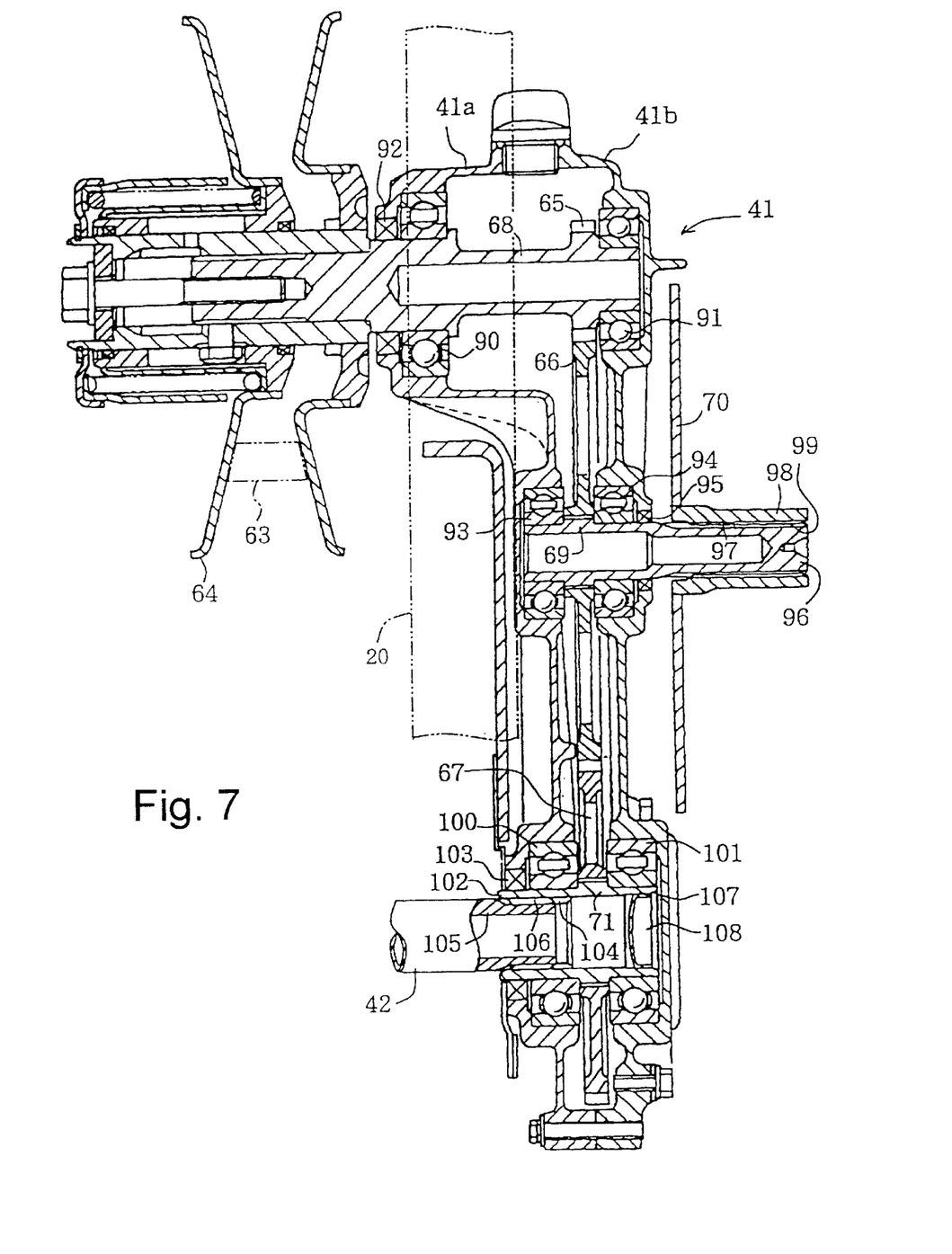
FIG. 7 is a sectional view of a driven side pulley and a final reduction gear portion.

As will be apparent from FIG. 7, the input shaft 68 of the gear box 41 is rotatably supported by bearings 90 and 91, and the extension of the input shaft 68 extending from the gear box 41 on the driven side pulley 64 side is provided with a seal 92.

The idle shaft 69 is, similarly, rotatably supported by bearings 93 and 94, and the extension of the idle shaft 69 extending from the gear box 41 on the brake disk 70 side is provided with a seal 95. A spline groove 97 is formed in an outer peripheral portion of the extension portion 96. A boss 98 to be fitted around the outer periphery of the extension portion 96 is provided at a central portion of the brake disk 70. A spline groove 99 is formed in an inner peripheral surface of the boss 98, and is engaged with the spline groove 97, whereby the boss 98 is movable in the axial direction.

The final shaft 71 is, similarly, rotatably supported by bearings 100 and 101. The final shaft 71 is a hollow shaft with one end 102 being opened on side surface of the gear box 41. A seal 103 is provided around the one end 102. A spline groove 104 is formed in an inner surface of the one end 102 in such a manner so as to extend inwardly from the open end side.

One end 105 of the drive shaft 42 is fitted on the one end 102 side. A spline groove 106 formed in an outer peripheral portion of the one end 105 is engaged with the spline groove 104, allowing the final shaft 71 to be rotated integrally with the drive shaft 42. A cap 108 is fitted in the other end 107 of the final shaft 71 to seal the hollow final shaft 71.

Figure 8:
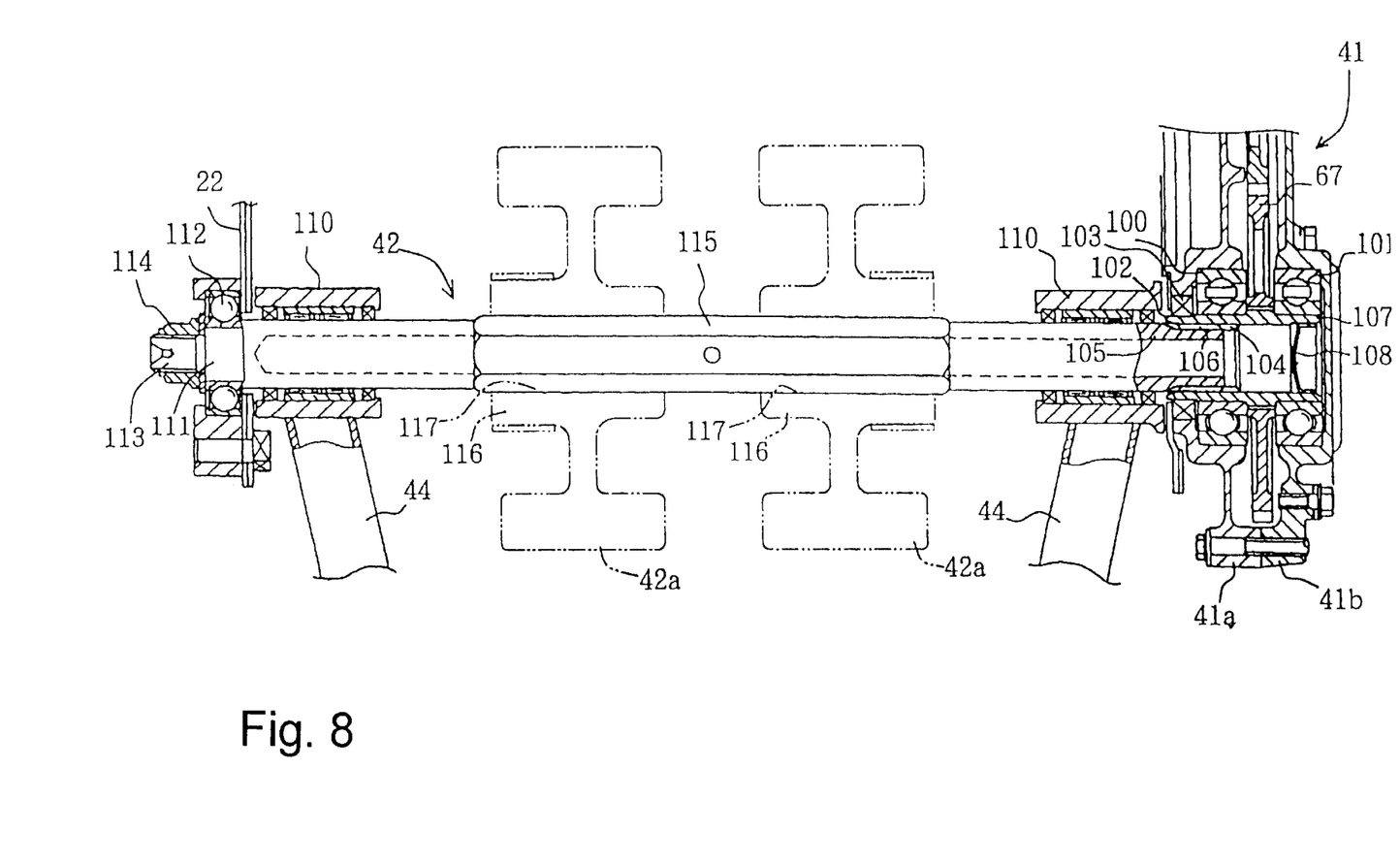
FIG. 8 is a sectional view showing a supporting structure of a drive shaft.

As will be apparent from FIG. 8, both end portions of the drive shaft 42 pass through and are supported by bearing supporting portions 110 provided at front end portions of the right and left rear arms 44. The other end opposite to the one end 105 forms a small diameter portion 111 which is rotatably supported by a bearing 112 supported by the pivot plate 22. A leading end of the small diameter portion 111 forms a projecting threaded portion 113 which is fastened to the bearing 112 by a nut 114.

An outer periphery of the intermediate portion of the drive shaft 42 is formed into a hexagonal portion 115 to be engaged with hexagonal holes 117 formed in centers of the boss portions 116 of the drive wheels 42a, whereby the drive wheels 52a are rotatable integrally with the drive shaft 42

Figure 9:
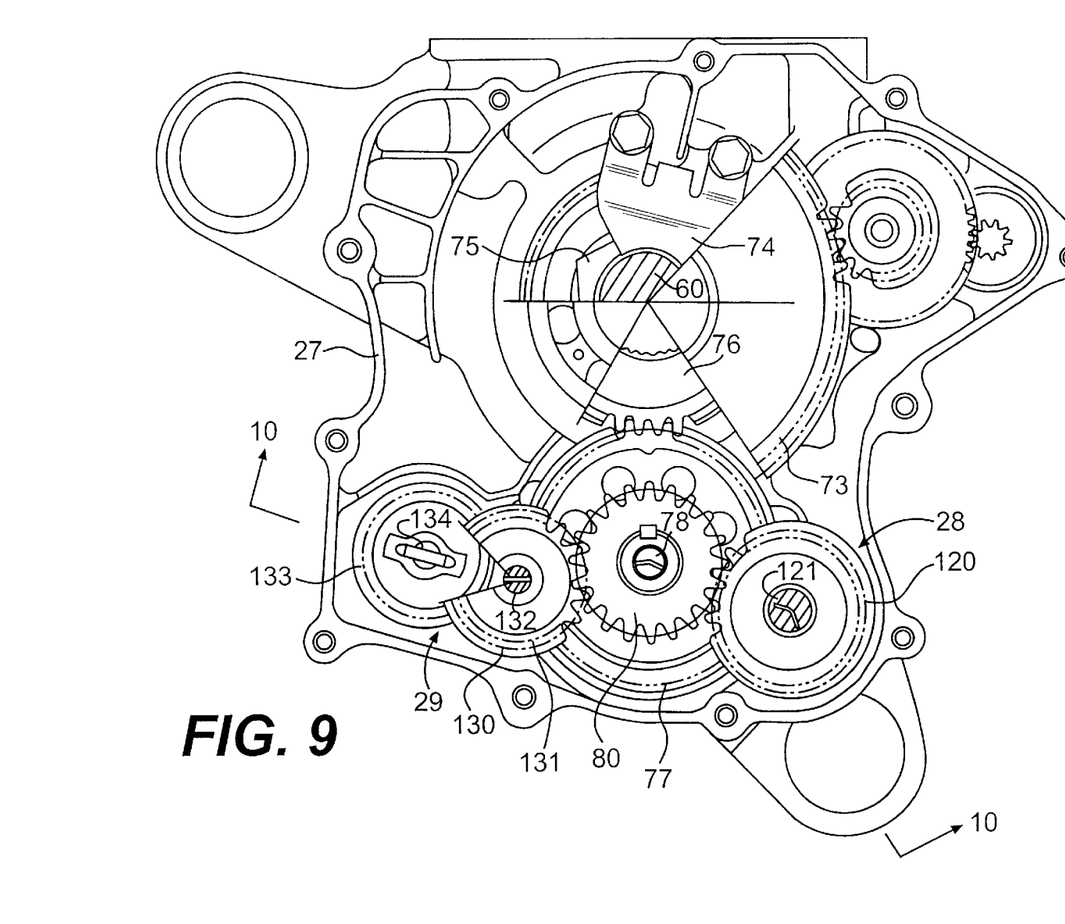
FIG. 9 is a view showing the interior of the crank case, partially cutaway from the left side.

Next, each of structures for driving the water pump 28 and the oil pump 29 will be described in detail with reference to FIGS. 9 and 10. FIG. 9 is a view showing the interior of the crank case 27, partially cutaway from the left side, and FIG. 10 is a sectional view taken on line 10—10 of FIG. 9, showing the water pump 28 and the oil pump 29.

Figure 10:
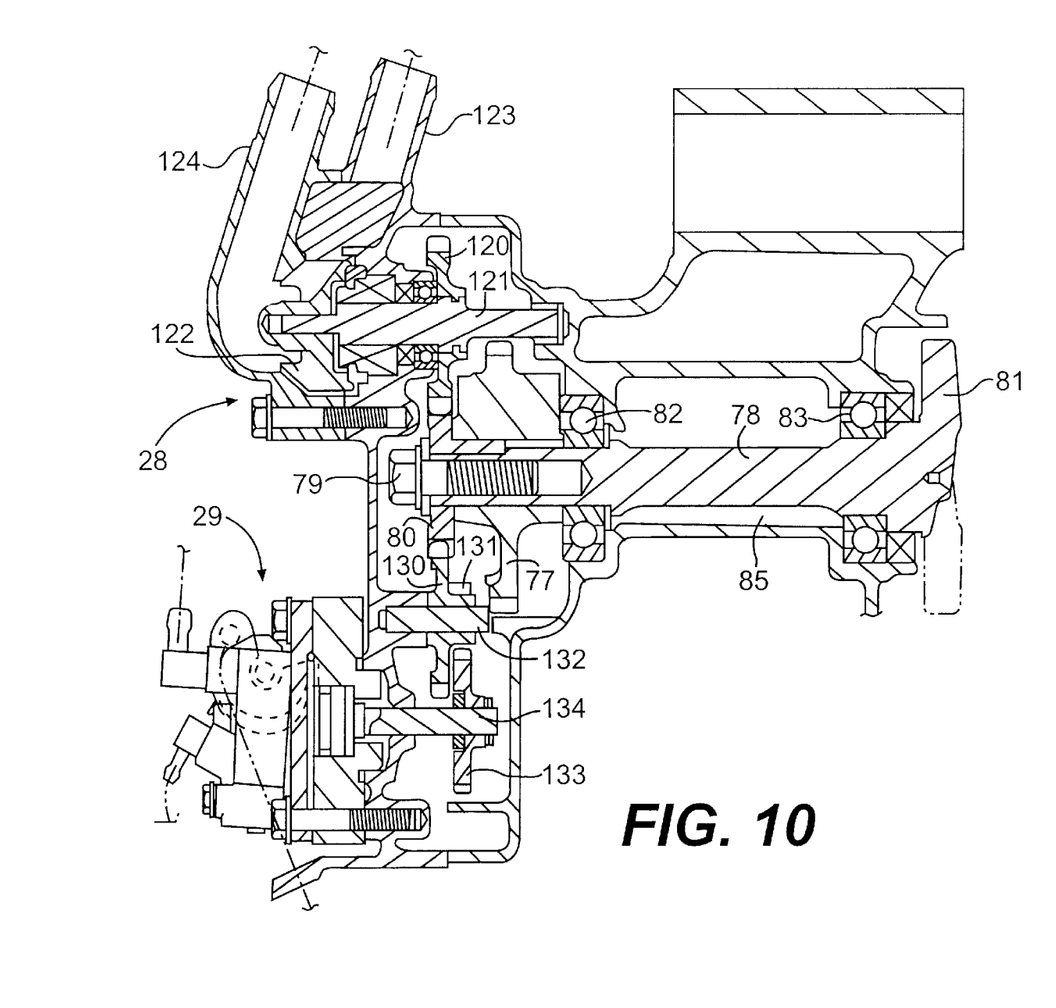
FIG. 10 is a sectional view showing a water pump and an oil pump.

As will be apparent from FIGS. 9 and 10, a pump drive gear 80 mounted on an axial end of the balancer shaft 78 is meshed with a water pump driven gear 120 of the water pump 28 to rotate a water jet fan 122 through a water pump shaft 121. This allows cooling water to be sucked from a suction side joint 124 communicated to the heat exchanger 30 and then to be press-fed from a discharge side joint 123 to a cylinder portion 126.

The pump drive gear 80 is meshed with a large diameter portion 130 provided on a reduction gear rotating around an intermediate shaft 132, and a small diameter portion 131 of the same intermediate shaft 132 is meshed with an oil pump driven gear 133, to rotate the oil pump 29 through an oil pump shaft 134.

As shown in FIG. 9, the balancer shaft 78 is disposed in parallel to and directly under the crank shaft 60, and the balancer shaft 78 is in parallel to pump shafts 121 and 134 of the water pump 28 and the oil pump 29. The water pump 28 is disposed behind the balancer shaft 78 and the oil pump 29 is disposed in front of the balancer shaft 78. That is, the balancer shaft 78 is put between the water pump 28 and the oil pump 29.

The function of this embodiment will be described below. As shown in FIGS. 6, 9 and 10, the drive side pulley 62 of the V-belt type transmission is provided on one end of the crank shaft 60 and the balancer drive gear 76 is disposed opposite to the drive side pulley 62 in the axial direction in such a manner so as to hold the crank weight 60a between the drive side pulley 62 and the balancer drive gear 76. Consequently, it is not required to provide the balancer drive gear 76 requiring lubrication between the crank chamber 86 and the drive side pulley 62, so that the drive side pulley 62 can be disposed at a position near the crank chamber 86. Thus, it is possible to eliminate the necessity of increasing the length of the crank shaft 60.

Accordingly, the pump drive structure can be simplified by driving the water pump 28 and the oil pump 29 using the balancer shaft 78. Further, although the drive side pulley 62 of the V-belt type transmission is connected to the crank shaft 60 of the two-cycle engine for primarily compressing a fuel-air mixture in the crank chamber 86, the necessity of increasing the width and weight of the body can be eliminated. Additionally, since the balancer shaft 78 is disposed directly under the crank shaft 60, the gravity center can be lowered.

Since the water pump 28 and the oil pump 29 are distributed on the front and rear sides of the balanced shaft 78 and are driven by the common balancer shaft 78, these pumps 28 and 29 can be effectively driven and also the accessories can be concentratedly disposed under the crank case 27 of the engine 25.

The water pump 28 is disposed behind the balanced shaft 78, and consequently, by providing the heat exchanger 30 in the floor 4 over the track belt 43 and communicating the heat exchanger 30 to the water pump 28, the piping between the heat exchanger 30 and the water pump 28 can be shortened and also the piping structure can be simplified. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pump drive structure for a two-cycle engine comprising:
    a crank shaft operatively, rotably connected within said two-cycle engine;
    a balancer shaft being provided in parallel to said crank shaft of said two-cycle engine;
    a balancer drive gear operatively connected to said balancer shaft and said crank shaft for providing rotation to said balancer shaft, said balancer drive gear being disposed on one side of said engine and said balancer shaft being provided directly under said crank shaft;
    a pump driven by said balancer shaft;
    a drive side pulley of a V-belt type transmission being mounted on one end of said crank shaft on an opposite side of said engine relative to said balancer drive gear in an axial direction with a crank weight being positioned therebetween.

2. The pump drive structure for a two-cycle engine according to claim 1, wherein said pump is a water pump and an oil pump both being driven by said balancer shaft, and said water pump and said oil pump are distributed on a front and rear sides of said balancer shaft.

3. The pump drive structure of a two-cycle engine according to claim 2, said water pump being disposed behind said balancer shaft, and said water pump for communication with a heat exchanger.

4. The pump drive structure of a two-cycle engine according to claim 1, wherein said balancer drive gear is mounted on said crank shaft, the balancer drive gear meshing with a driven gear of said pump, a pump drive gear directly coupled to the driven gear for suppling rotary motion between said balancer drive gear and said pump drive gear of said pump.

5. The pump drive structure of a two-cycle engine according to claim 4, wherein said pump drive gear of said pump rotates a water pump and said pump drive gear is in meshing engagement with a reduction gear rotating on an intermediate shaft being in meshing engagement with a driven gear of an oil pump.

6. The pump drive structure of a two-cycle engine according to claim 5, wherein crank shaft, said balancer shaft, a drive shaft of said water pump and a drive shaft of said oil pump are arranged in parallel relative to each other and said drive shaft of said water pump being disposed to one side of said balancer shaft with said drive shaft of said oil pump being disposed to an opposite side of said balancer shaft.

7. The pump drive structure of a two-cycle engine according to claim 1, wherein said crank weight is disposed between said V-belt transmission and said balancer drive gear and said balancer drive gear is displaced from said crank weight for eliminating the need for providing lubrication for the balancer drive gear between a crank chamber and the V-belt transmission.

\* \* \* \* \*